United States Patent
Yamamoto et al.

(10) Patent No.: US 9,590,464 B2
(45) Date of Patent: *Mar. 7, 2017

(54) ELECTRIC MOTOR HAVING AIR TIGHTNESS TEST HOLES

(71) Applicant: FANUC CORPORATION, Minamitsuru-gun, Yamanashi (JP)

(72) Inventors: Tomonaga Yamamoto, Minamitsuru-gun (JP); Makoto Funakubo, Minamitsuru-gun (JP)

(73) Assignee: FANUC CORPORATION, Minamitsuru-gun, Yamanashi (JP)

( * ) Notice: Subject to any disclaimer, the term of this patent is extended or adjusted under 35 U.S.C. 154(b) by 344 days.

This patent is subject to a terminal disclaimer.

(21) Appl. No.: 14/045,936

(22) Filed: Oct. 4, 2013

(65) Prior Publication Data

US 2014/0097716 A1    Apr. 10, 2014

(30) Foreign Application Priority Data

Oct. 9, 2012   (JP) ................................. 2012-224479

(51) Int. Cl.
*H02K 5/124* (2006.01)
*H02K 5/10* (2006.01)
(Continued)

(52) U.S. Cl.
CPC ................. *H02K 5/22* (2013.01); *H02K 5/04* (2013.01); *H02K 5/124* (2013.01); *H02K 5/15* (2013.01);
(Continued)

(58) Field of Classification Search
CPC   H02K 5/22; H02K 5/04; H02K 5/124; H02K 5/15; H02K 5/16; H02K 5/10;
(Continued)

(56) References Cited

U.S. PATENT DOCUMENTS 2,238,925 A  *  4/1941  Brown ..................... H02K 9/14
                                                          310/57
3,917,364 A  *  11/1975  Kuhn ........................... 384/132
(Continued)

FOREIGN PATENT DOCUMENTS

CN           1437301 A        8/2003
CN         102969823 A        3/2013
(Continued)

OTHER PUBLICATIONS

JP 2010031837 English Translation.*
(Continued)

*Primary Examiner* — Joshua Benitez-Rosario
*Assistant Examiner* — Alexander Moraza
(74) *Attorney, Agent, or Firm* — Drinker Biddle & Reath LLP

(57) ABSTRACT

Through a housing of an electric motor, an output shaft attached to a rotor penetrates. In this housing, an air tightness test hole of the electric motor which communicates with internal space of the electric space formed with the housing and a stator is formed. Further, an oil seal which blocks aeration between the internal space and an outside of the electric motor is attached to this housing.

6 Claims, 5 Drawing Sheets

(51) Int. Cl.
*H02K 5/22* (2006.01)
*H02K 5/15* (2006.01)
*F16J 15/54* (2006.01)
*H02K 5/04* (2006.01)
*F16J 15/32* (2016.01)

(52) U.S. Cl.
CPC ............ *F16J 15/3272* (2013.01); *F16J 15/54* (2013.01); *H02K 5/10* (2013.01)

(58) Field of Classification Search
CPC .... H02K 5/132; H02K 5/136; F16J 15/32; F16J 15/3272; F16J 15/54
USPC ................ 310/88, 89, 87, 90, 91, 85, 7, 918
See application file for complete search history.

(56) References Cited

U.S. PATENT DOCUMENTS

| | | | |
|---|---|---|---|
| 2001/0045784 A1* | 11/2001 | Niimi | H02K 5/10 310/85 |
| 2003/0151320 A1 | 8/2003 | Poon et al. | |
| 2013/0049503 A1* | 2/2013 | Funakubo | 310/88 |

FOREIGN PATENT DOCUMENTS

| | | | | |
|---|---|---|---|---|
| CN | 202817966 U | | 3/2013 | |
| JP | 56-30554 U | | 3/1981 | |
| JP | S5840761 Y2 | * | 9/1983 | ............... H02K 5/10 |
| JP | 2-83656 U | | 6/1990 | |
| JP | 2002058194 A | | 2/2002 | |
| JP | 3553862 B2 | * | 8/2004 | |
| JP | 2008-011591 A | | 1/2008 | |
| JP | 2008092798 A | * | 4/2008 | |
| JP | 2010031837 A | * | 2/2010 | |
| JP | 2013-051752 A | | 3/2013 | |

OTHER PUBLICATIONS

JP 2008092798 English Translation.*
Inamura (JP 3553862 B2) English Translation.*
JPS5840761 (English Translation).*
Office Action issued May 12, 2015 in corresponding Chinese Patent Application No. 201310467312.9 (6 pages) with English Translation (9 pages).

* cited by examiner

ELECTRIC MOTOR HAVING AIR TIGHTNESS TEST HOLES

RELATED APPLICATION DATA

This application claims priority under 35 U.S.C. §119 and/or §365 to Japanese Application No. 2012-224479 filed Oct. 9, 2012, the entire contents is incorporated herein by reference.

BACKGROUND OF THE INVENTION

1. Field of the Invention

The present invention relates to an electric motor having an air tightness test hole which communicates with an internal space of the electric motor, in a housing of the electric motor.

2. Description of the Related Art

An electric motor which is used for an industrial machine including a machine tool or an industrial robot is required to have high oil resistance and drip proofness, and the electric motor needs to have high air tightness. A method of checking or testing air tightness of an electric motor in electric motor manufacturing process is a method of checking leakage of air to an outside of an electric motor or an inflow of air to an inside from an outside of the electric motor by applying a positive pressure or a negative pressure to an interior of the electric motor.

As illustrated in FIG. 9, a conventional electric motor 10 is formed with a stator 14 which has a winding (not illustrated), housings 12 and 16 which are attached to both ends of this stator 14 and a rotor (not illustrated) which has an output shaft 20. The rotor and the winding of the stator 14 are arranged in space formed with the stator 14 and the housings 12 and 16 at both ends of the stator 14.

Ball bearings 22 are attached to center positions of the housings 12 and 16, and the output shaft 20 provided to the rotor is supported by the ball bearings 22. Further, the stator 14 has a power terminal 18 which is a terminal which receives an input of power for driving the electric motor 10, and the housing 16 has a position/speed detector 24 which detects a rotation position and a speed of the output shaft 20.

Regarding such an electric motor, when an air tightness test of an interior of the electric motor is conducted, the air tightness test can be conducted without detaching the ball bearings 22 in a case where sealing performance of the ball bearings 22 is not high. However, in a case where the ball bearings 22 having seals of increased air tightness are used in order to prevent bearing grease in particular from flowing out, an air tightness test is conducted with the ball bearings 22 detached from the electric motor.

As another technique, Japanese Patent Application Laid-Open No. 2008-11591 discloses a technique of covering entirety of a decelerating device and an electric motor by means of an airtight container formed with a first shell, a second shell and a third shell, providing an air tightness test hole to this air tight container and testing air tightness of the entire structure formed with the decelerating device and the electric motor. This technique is a technique of testing air tightness of the entire structure formed with the decelerating device and the electric motor, and cannot test air tightness of the electric motor itself.

Further, when bearings which have oil seals of high sealing performance are used as bearings which support the output shaft 20 of the rotor to prevent bearing grease in particular from flowing out, air cannot pass through these bearings even when the oil seals are detached, and therefore it is not possible to apply the pressure to the interior of the electric motor. Hence, unless a portion which communicates with the inside of the electric motor is additionally provided by detaching the bearings or pushing out the oil seals of the bearings, it is not possible to apply the pressure to the interior of the electric motor. That is, when bearings of high sealing performance as described above are used in an electric motor, man-hours of an air tightness test of this electric motor increases.

SUMMARY OF THE INVENTION

It is therefore an object of the present invention to provide an electric motor which can reduce man-hours of an air tightness test of the electric motor by providing an air tightness test hole which communicates with an inside of the electric motor.

An electric motor according to the present invention has: a stator portion which has a winding; a housing which is attached to an end of the stator portion; a rotor portion which has an output shaft; and an oil seal which is attached to the housing such that the output shaft penetrates therethrough, and an air tightness test hole of the electric motor which communicate with internal space of the electric motor formed with the stator portion and the housing is provided in the housing.

The electric motor according to the present invention has the air tightness hole of the electric motor which communicates with the internal space of the electric motor, and, consequently, can easily conduct an air tightness test of the electric motor.

A shape of the air tightness test hole of the electric motor may be circular or polygonal.

The air tightness test hole of the electric motor may be provided at one or more arbitrary positions each spaced an arbitrary distance apart from a rotation center of the output shaft. By doing this, when the oil seal is attached to the housing, aeration between the internal space of the electric motor and an outside of the electric motor can be blocked.

The air tightness test hole of the electric motor may be provided at one or more arbitrary positions spaced an arbitrary distance apart from a rotation center of the output shaft. By doing this, when a seal member formed with the oil seal and an oil seal holding member is attached to the housing, aeration between the internal space of the electric motor and an outside of the electric motor can be blocked.

According to the present invention, by providing in a housing of the electric motor an air tightness test hole which communicates with an inside of an electric motor, it is possible to provide the electric motor which can reduce man-hours of an air tightness test.

BRIEF DESCRIPTION OF THE DRAWINGS

The above and other objects and features of the present invention will be made obvious from the following embodiment by referring to the accompanying drawings. Of these drawings.

DETAILED DESCRIPTION OF THE PREFERRED EMBODIMENTS

Figure 1:
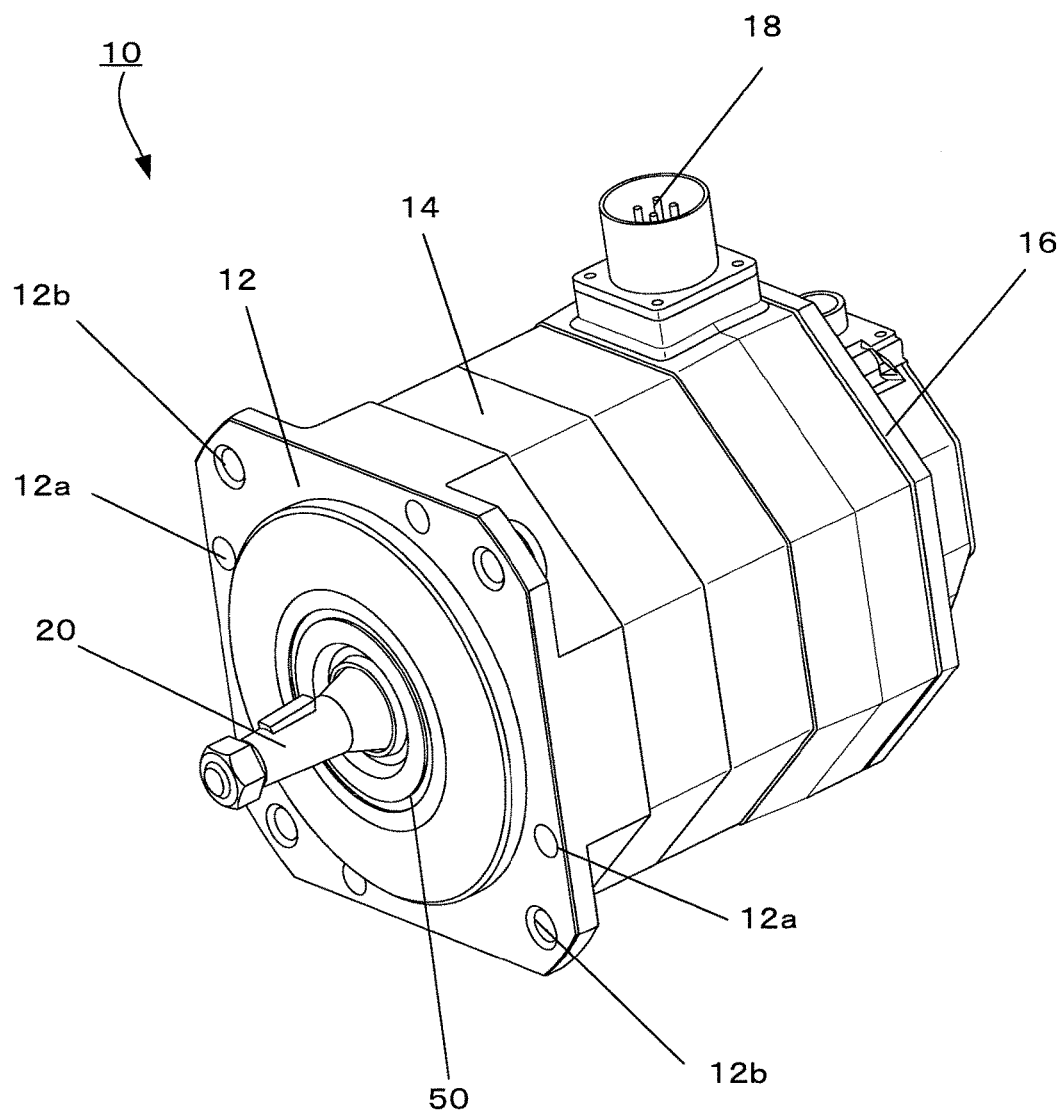
FIG. 1 is an outlook perspective view of one embodiment of an electric motor according to the present invention.

As illustrated in FIG. 1, an electric motor 10 has a stator 14 which has a winding (not illustrated), first and second housings 12 and 16 which are attached to both ends of this stator 14 and a rotor (not illustrated) which has an output shaft (rotation shaft) 20. The rotor and the winding of the stator 14 are arranged in space formed with the stator 14 and the first and second housings 12 and 16 at both ends of the stator 14.

Ball bearings 22 are attached to center positions of the first and second housings 12 and 16, and the output shaft 20 provided to the rotor is supported by these ball bearings 22. The housing 12 is made of metal such as aluminum alloy and iron. Further, the stator 14 has a power terminal 18 which is a terminal which receives an input of power for driving the electric motor 10, and the second housing 16 has a position/speed detector 24 which detects a rotation position and a speed of the output shaft 20.

Figure 2:
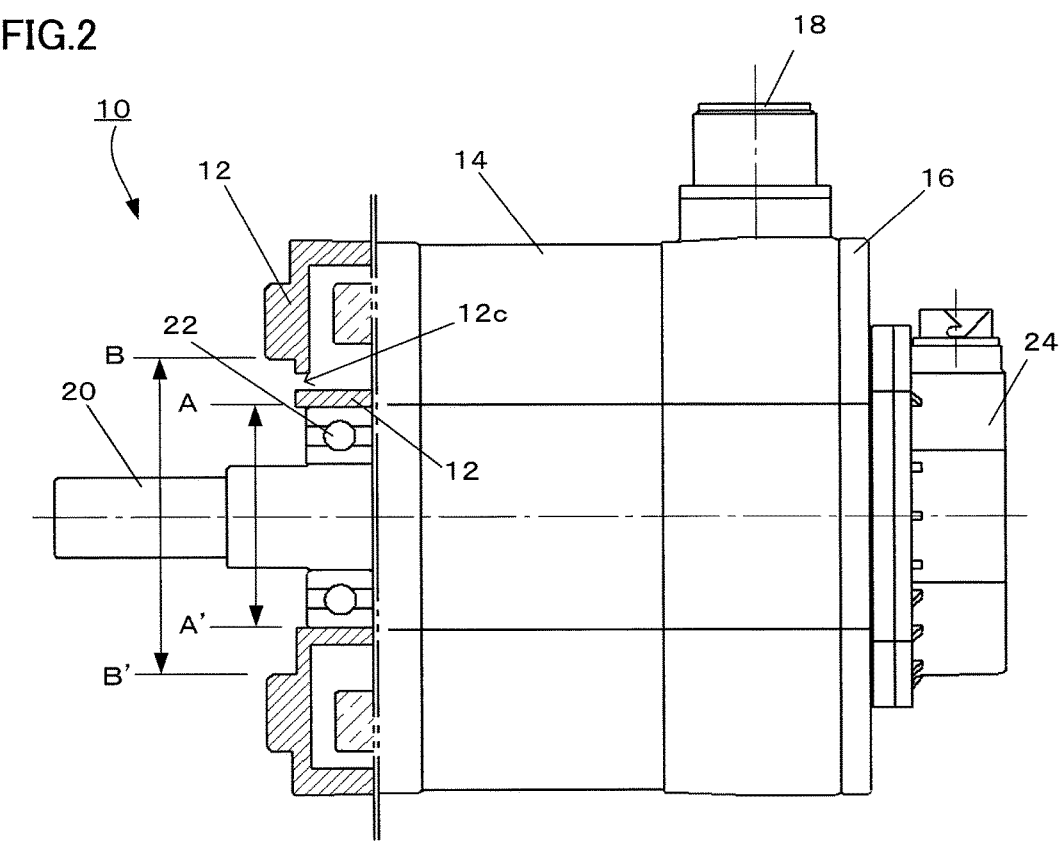
FIG. 2 is a side view (partial cross-sectional view) for explaining a state in which an oil seal is detached from the electric motor in FIG. 1.

As illustrated in FIG. 2, in a first housing 12 side end surface of the stator 14, a plurality of bolt holes (not illustrated) for fixing the first housing 12 (the first housing 12 is hereinafter simply referred to as a "housing 12") to the stator 14 is provided. On the other hand, to a surface of the housing 12 opposite to the surface fixed to the stator 14, an oil seal 50 is attached as illustrated in FIG. 1. This oil seal 50 has a function of sealing the output shaft 20 portion provided to the rotor.

Figure 3:
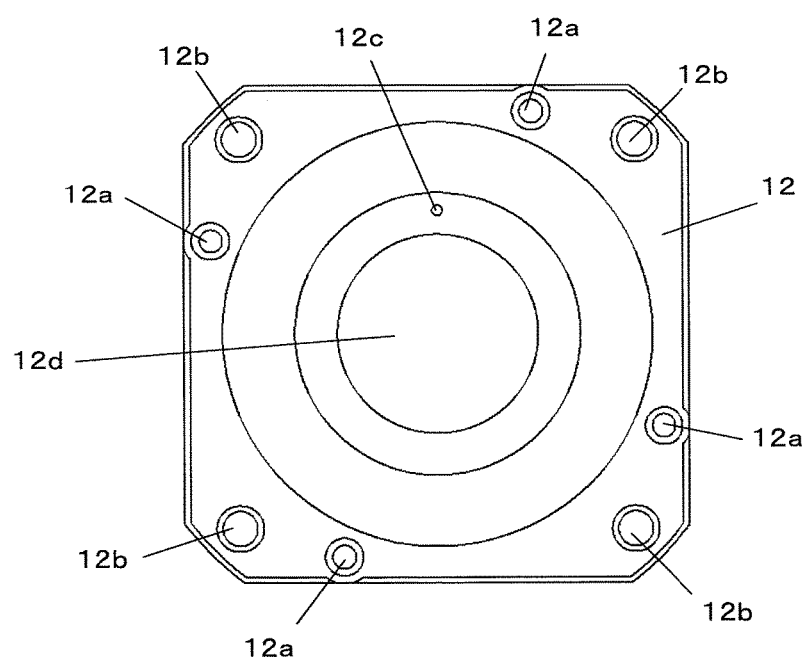
FIG. 3 illustrates the electric motor in FIG. 2 as viewed from an output shaft side.

As illustrated in FIG. 3, in the housing 12, a penetration hole 12d through which the output shaft 20 provided to the rotor penetrates is provided in the center of the housing, and bolt holes 12a are provided at a plurality of positions corresponding to the bolt holes of the stator 14. In this housing 12, a plurality of bolt holes 12b which fixes the electric motor 10 to an mechanism portion such as a machine tool (not illustrated) and an air tightness test hole 12c of the electric motor are further provided.

The air tightness test hole 12c of the electric motor is formed at a position of the housing 12 which is spaced apart a distance which is smaller than half of the outer diameter (B-B' in FIG. 2) of the oil seal 50 (not illustrated in FIG. 2) attached to the housing 12 and which is larger than half of the outer diameter (A-A' in FIG. 2) of the ball bearing 22 which supports the rotor. Further, this air tightness test hole 12c of the electric motor is a penetration hole which is provided in the housing 12 and a cross section of which is circular or polygonal, and is formed as a hole which communicates with an inside of the electric motor in which the stator 14 and the rotor are arranged.

Figure 4:
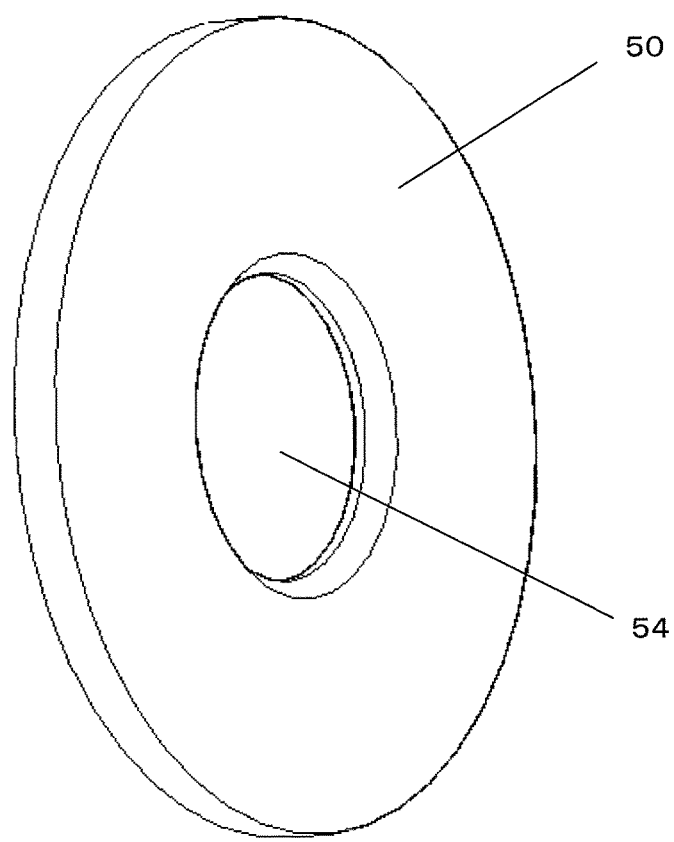
FIG. 4 is a view illustrating an example of an oil seal attached to the electric motor in FIG. 2.

As illustrated in FIG. 4, the oil seal 50 attached to the housing 12 is a flat member formed by covering a surface of a plate made of metal such as iron by an elastic material such as rubber, and has at the center a penetration hole 54 through which the output shaft 20 provided to the rotor penetrates. The plate which forms the oil seal 50 has a disk shape and the penetration hole 54 formed in the center of the oil seal 50 is circular, and therefore the oil seal 50 has an annular shape. This oil seal 50 seals the electric motor 10 by decreasing as much as possible a gap between an inner peripheral surface of the penetration hole 54 and an outer peripheral surface of the output shaft 20 which passes through this penetration hole 54.

Figure 5:
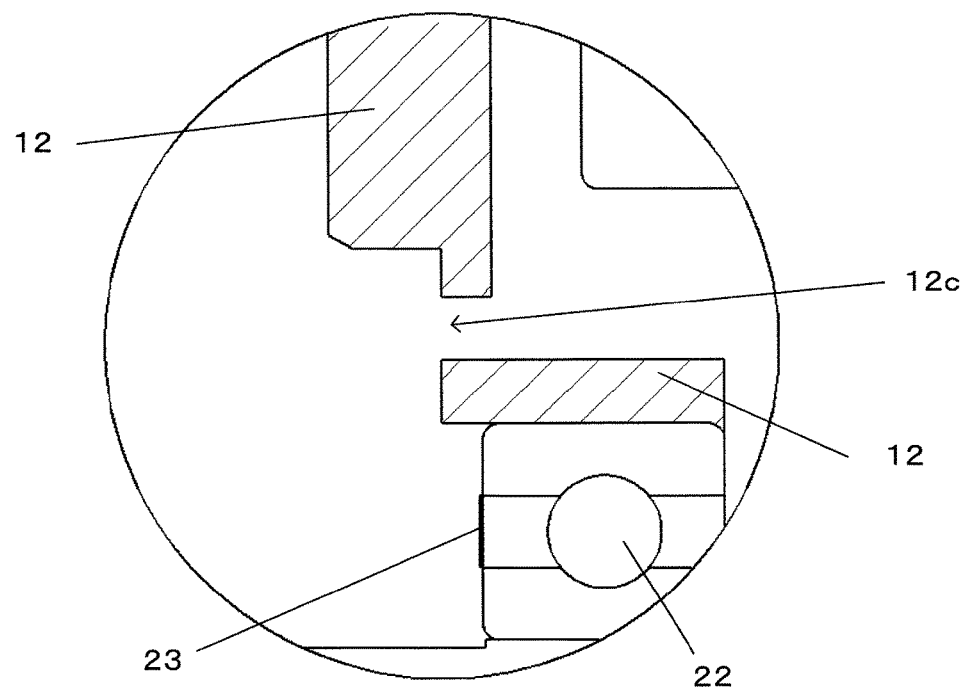
FIG. 5 is an enlarged view illustrating a vicinity of an air tightness test hole provided in a housing of the electric motor in FIG. 2.
Figure 6:
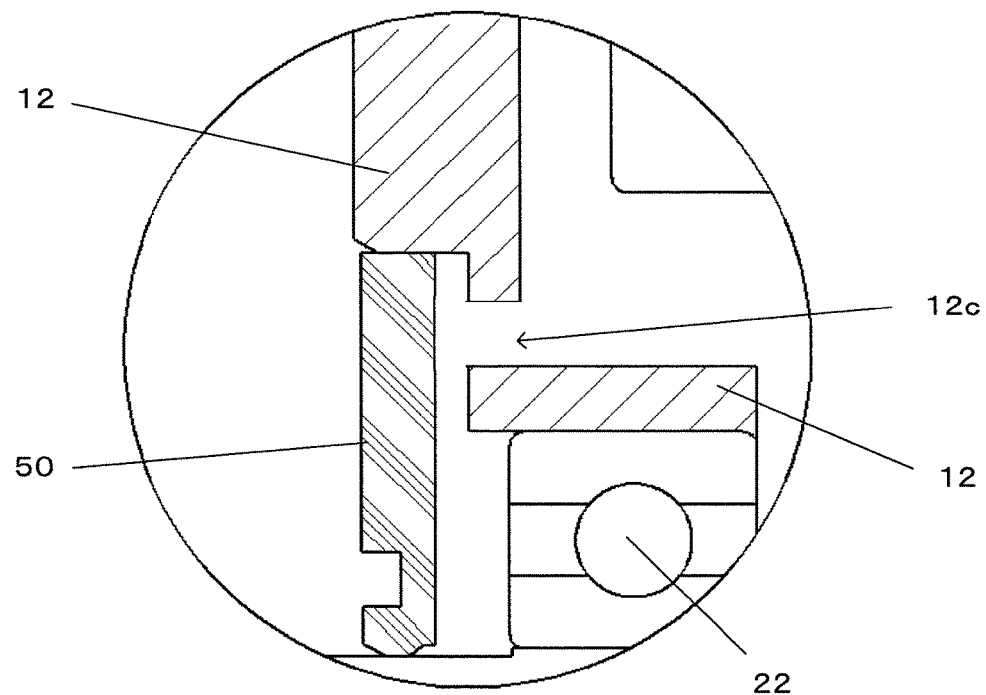
FIG. 6 is an enlarged view illustrating a state in which the oil seal is attached to the housing of the electric motor in FIG. 5.

As illustrated in FIG. 5, the surface of the ball bearing 22 is sealed by a bearing seal portion 23. As illustrated in FIG. 6, when the oil seal 50 is attached to the housing 12, rubber on the surface of the oil seal 50 having elasticity is pressed against the surface of the housing 12 to seal the output shaft 20 portion provided to the rotor. Although the air tightness test hole 12c of the electric motor is not blocked by the oil seal 50 in this case, when the oil seal 50 is attached to the housing 12, aeration between internal space of the electric motor 10 and an outside of the electric motor 10 is blocked, so that it is possible to keep air tightness of the electric motor 10.

By conducting an air tightness test of the electric motor 10 in a state in which the oil seal 50 is not attached and then attaching the oil seal 50 after the air tightness test is finished, it is possible to reduce entire man-hours in carrying out an air tightness test of an electric motor in which ball bearings 22 of high sealing performance are used.

Figure 7:
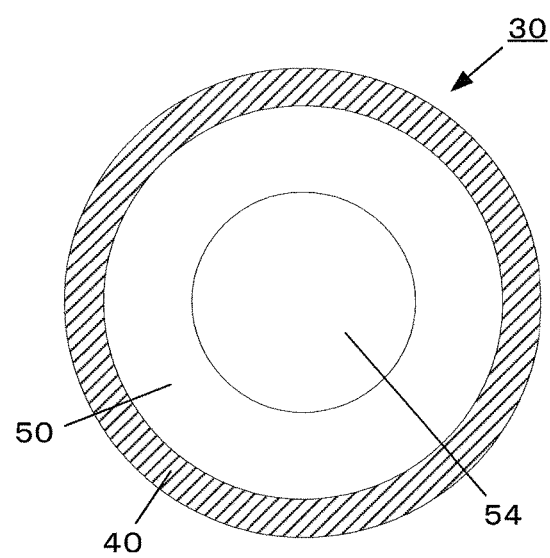
FIG. 7 is a front view of a member which is formed with an oil seal and a holding member instead of the oil seal illustrated in FIG. 6.

Although the oil seal 50 in FIG. 4 is a flat member made by covering a surface of a plate made of metal by an elastic material such as rubber, a seal member 30 formed with the oil seal 50 and the holding member 40 as illustrated in FIG. 7 may be attached to the housing 12 instead of the oil seal 50 in FIG. 4. Although the oil seal 50 which forms this seal member 30 is a flat member made by covering the surface of the plate made of metal by an elastic material such as rubber, the oil seal is smaller than the diameter of the oil seal 50 in FIG. 4. Meanwhile, the holding member 40 which forms this seal member 30 is attached to an outer side of the oil seal 50 to surround an outer peripheral surface of the oil seal 50 of the small diameter, and is made of metal such as aluminum and iron.

Figure 8:
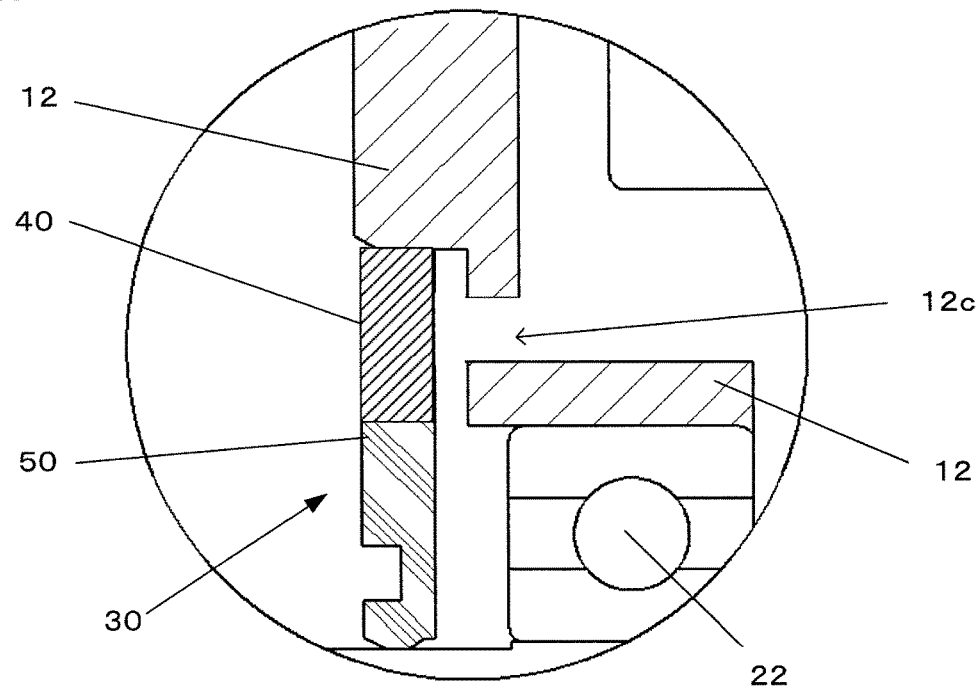
FIG. 8 is an enlarged view illustrating that a member formed with the oil seal and the holding member illustrated in FIG. 7 is used instead of the oil seal in FIG. 6.
Figure 9:
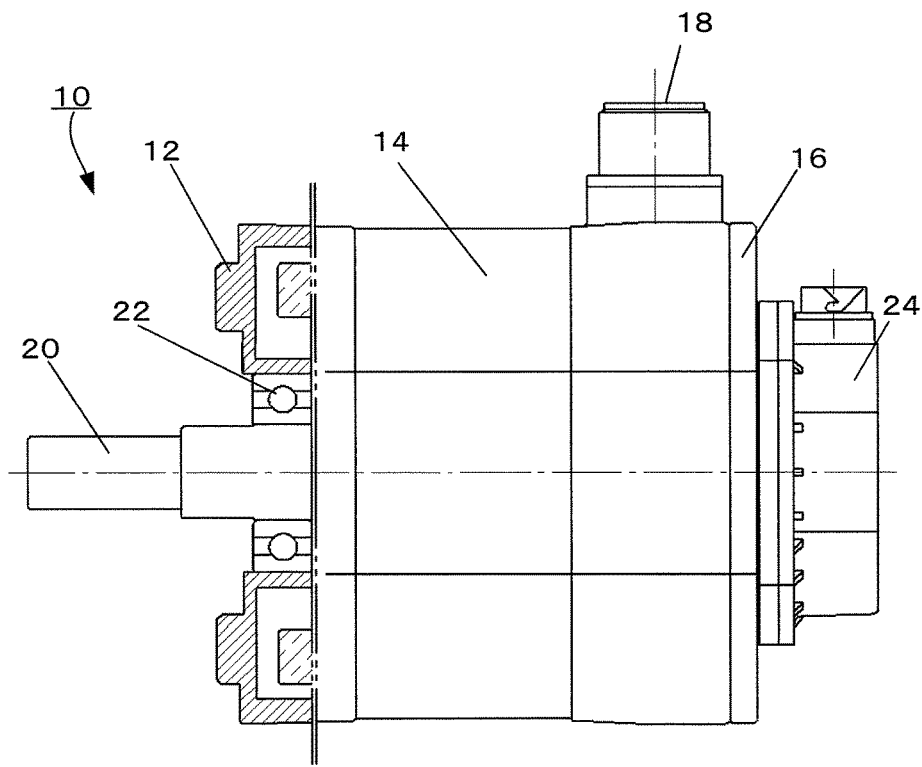
FIG. 9 is a side view (partial cross-sectional view) of an electric motor according to a conventional technique.

This seal member 30 keeps air tightness between the oil seal 50 and the holding member 40 by means of elasticity of rubber on the surface of the oil seal 50, and air tightness between the holding member 40 and the housing 12 is kept by making metal members contact each other or providing an O ring therebetween as illustrated in FIG. 8. As a result, although in a case where the seal member 30 is attached to the housing 12, similar to a case where the oil seal 50 illustrated in FIG. 6 is attached, the air tightness test hole 12c of the electric motor is not blocked, but the oil seal 50 which forms the seal member 30 can seal the electric motor 10 by decreasing as much as possible a gap between the inner peripheral surface of the penetration hole 54 and the outer peripheral surface of the output shaft 20 which passes through this penetration hole 54.

In addition, although, in the present embodiment, the air tightness test hole 12c of the electric motor is formed at a position of the first housing 12 which is spaced apart a distance which is smaller than half of the oil seal 50 attached to the housing 12 and which is larger than half of the outer diameter of the ball bearing 22 which supports the rotor, such air tightness test hole 12c may be formed at another portion in the first housing 12 or may also be formed at an appropriate position in the second housing 16.

Further, although the oil seal 50 has an annular shape in the present embodiment, the shape thereof is not limited to the annular shape and the oil seal have any shape as long as the shape shuts off the internal space of the electric motor and the outside of the electric motor 10.

What is claimed is:

1. An electric motor comprising: a stator portion which comprises a winding; a housing which is attached to an end of the stator portion; a rotor portion which comprises an output shaft; a bearing which supports the rotor portion; and an oil seal which is attached to the housing such that the output shaft penetrates therethrough, wherein an air tightness test hole of the electric motor which communicates with internal space of the electric motor formed with the stator portion and the housing is provided at a position spaced from a rotation center of the output shaft in a radial direction at a distance larger than half of the outer diameter of the bearing and at a distance smaller than half of the outer diameter of the oil seal, and the oil seal seals the air tightness test hole of the electric motor.

2. The electric motor according to claim 1, wherein a shape of the air tightness test hole of the electric motor is circular or polygonal.

3. The electric motor according to claim 1, wherein when the oil seal is attached to the housing, aeration between the internal space of the electric motor and an outside of the electric motor is blocked.

4. The electric motor according to claim 1, wherein when a seal member formed with the oil seal and an oil seal holding member is attached to the housing, aeration between the internal space of the electric motor and an outside of the electric motor is blocked.

5. The electric motor according to claim 2, wherein when the oil seal is attached to the housing, aeration between the internal space of the electric motor and an outside of the electric motor is blocked.

6. The electric motor according to claim 2, wherein when a seal member formed with the oil seal and an oil seal holding member is attached to the housing, aeration between the internal space of the electric motor and an outside of the electric motor is blocked.

* * * * *